(12) United States Patent
Eckman

(10) Patent No.: US 10,242,273 B1
(45) Date of Patent: Mar. 26, 2019

(54) TRACKING VEHICLES IN A WAREHOUSE ENVIRONMENT

(71) Applicant: Lineage Logistics, LLC, Irvine, CA (US)

(72) Inventor: Christopher Frank Eckman, San Francisco, CA (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

(21) Appl. No.: 15/993,343

(22) Filed: May 30, 2018

(51) Int. Cl.
*G06K 9/00* (2006.01)
*G06T 7/73* (2017.01)
*H04N 13/204* (2018.01)

(52) U.S. Cl.
CPC ..... *G06K 9/00805* (2013.01); *G06K 9/00771* (2013.01); *G06T 7/75* (2017.01); *H04N 13/204* (2018.05); *G06T 2207/10012* (2013.01); *G06T 2207/30261* (2013.01)

(58) Field of Classification Search
CPC ........... G06K 9/00805; G06K 9/00771; H04N 13/204; G06T 7/75; G06T 2207/10012; G06T 2207/30261
See application file for complete search history.

(56) References Cited

U.S. PATENT DOCUMENTS

| | | | |
|---|---|---|---|
| 9,797,988 | B2 | 10/2017 | Charvat et al. |
| 1,009,094 | A1 | 10/2018 | Charvat et al. |
| 2002/0003571 | A1* | 1/2002 | Schofield ................ B60C 23/00 348/148 |
| 2013/0096735 | A1* | 4/2013 | Byford ................ G05D 1/0231 701/2 |
| 2015/0347840 | A1* | 12/2015 | Iida ..................... H04N 13/271 382/103 |
| 2016/0090285 | A1* | 3/2016 | Svensson ............. B66F 9/0755 700/300 |

(Continued)

OTHER PUBLICATIONS

Aethon.com [online]. Spencer Allen, "Self-Driving Robot Navigation Methodology Explained," Oct. 27, 2016, [retrieved on Oct. 25, 2017], retrieved from: URL<http://www.aethon.com/our-navigation-methodology-explained/>, 7 pages.

(Continued)

*Primary Examiner* — Tom Y Lu (74) *Attorney, Agent, or Firm* — Fish & Richardson P.C.

(57) ABSTRACT

This specification generally discloses technology for tracking vehicle positions in a warehouse environment. A system receives stereoscopic image data from a camera on a forklift, in some implementations. The system recognizes an object that is represented in the stereoscopic image data, identifies a representation of the recognized object in a spatial model that identifies, for each of a plurality of objects in an environment, a corresponding location of the object in the environment, determines the location of the recognized object in the environment, determines a relative position between the forklift and the recognized object, based on a portion of the received stereoscopic image data that represents the recognized object, and determines a location of the forklift in the environment, based on the determined location of the recognized object in the environment, and the determined relative position between the forklift and the recognized object.

20 Claims, 7 Drawing Sheets (56) References Cited

U.S. PATENT DOCUMENTS

2018/0029797 A1\* 2/2018 Hance .................. B65G 1/0492
2018/0231651 A1 8/2018 Charvat
2018/0239010 A1 8/2018 Mindell et al.

OTHER PUBLICATIONS

D'Alfonso et al., "A SLAM algorithm for indoor mobile robot localization using an Extended Kalman Filter and a segment based environment mapping," Advanced Robotics (ICAR), 2013 16th International Conference on Nov. 25, 2013 (pp. 1-6).
Fioraio et al., "Realtime Visual and Point Cloud SLAM," Proc. of the RGB-D workshop on advanced reasoning with depth cameras at robotics: Science and Systems Conf.(RSS) Jun. 2011 (vol. 27).
Lemaire et al., "Vision-based SLAM: Stereo and Monocular Approaches," International Journal of Computer Vision. Sep. 1, 2007, 74(3):343-64.
Varga et al., "Improved Autonomous Loading Handling with Stereo Cameras," Intelligent Computer Communication and Processing (ICCP), 2015 IEEE International Conference on Sep. 3, 2015 (pp. 251-256).

\* cited by examiner

TRACKING VEHICLES IN A WAREHOUSE ENVIRONMENT

TECHNICAL FIELD

This document generally describes technology for tracking vehicle positions in a warehouse environment.

BACKGROUND

Warehouses include warehouse racks to store pallets of goods. Pallets are generally flat transport structures that support goods in a stable matter and that are adapted to fit forklifts and/or other devices/machines to move the pallets. Packages of various products can be stacked on top of the pallets. Warehouses have been designed to permit forklifts to put and pull pallets from racks as needed. Forklifts and other sorts of vehicles move through a warehouse and transport pallets and packages.

SUMMARY

This document generally describes computer-based technology for tracking vehicle positions in a warehouse environment.

A system receives stereoscopic image data from a camera on a forklift, in some implementations. The system recognizes an object that is represented in the stereoscopic image data, identifies a representation of the recognized object in a spatial model that identifies, for each of a plurality of objects in an environment, a corresponding location of the object in the environment, determines the location of the recognized object in the environment, determines a relative position between the forklift and the recognized object, based on a portion of the received stereoscopic image data that represents the recognized object, and determines a location of the forklift in the environment, based on the determined location of the recognized object in the environment, and the determined relative position between the forklift and the recognized object.

The systems, devices, program products, and processes described throughout this document can, in some instances, provide one or more of the following advantages. A stereoscopic camera system may include enhancements for adapting the camera to a warehouse environment such as a cold storage facility. A portion of a spatial model for representing objects in the warehouse environment may be locally maintained, thus facilitating vehicle location determination without a continuous network connection. Preprocessed image data may be provided by the stereoscopic camera system over a network, thus conserving bandwidth. Image data may be provided by the stereoscopic camera system at an interval that is less frequent than a frame rate of a camera that captures images, thus conserving bandwidth. A macro location of a vehicle may be determined using one or more environmental signals, and a micro location of the vehicle may be determined by analyzing only a portion of the spatial model that corresponds to the macro location, thus decreasing processing times and increasing location confidences.

The details of one or more embodiments are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

This document generally describes systems, devices, and techniques for tracking the positions of various vehicles in a warehouse environment. The vehicles, for example, can include forklifts, personnel carriers, burden carriers, stock chasers, and other sorts of manually operated vehicles, autonomous vehicles, and/or robots in the warehouse environment. In general, tracking a vehicle includes capturing stereoscopic images using one or more cameras affixed to the vehicle, recognizing an object in the stereoscopic images, and determining a location of the recognized object according to a spatial model. Based on the stereoscopic images of the recognized object, a relative position between the vehicle and the recognized object can be determined, and thus a location of the vehicle in the warehouse environment can be determined. By tracking the locations of warehouse vehicles in real time using stereoscopic images and spatial models, for example, vehicle location information may be relied on as being more current and more accurate than vehicle location information determined using other techniques (e.g., operator data entry, which may be inconsistent). The vehicle location information may then be reliably used by other systems and processes for determining storage locations for products to be stored in a warehouse, determining optimal routes for vehicle travel in the warehouse, and coordinating multiple vehicles in the warehouse. For example, traditional approaches for locating a vehicle in a warehouse, such as by operator data entry, are susceptible to high error rates and, as a result, high incidences of "misplaced" or "lost" pallets due the pallets being erroneously recorded as having been placed at inaccurate warehouse locations. According to the techniques described herein, a vehicle can use a camera system affixed to the vehicle to analyze its environment and determine its true location in the warehouse. When the vehicle, e.g., a forklift, places a pallet in a designated position on a rack in the warehouse, a computing system can check the location of the vehicle and verify that it is dropping the pallet off at an appropriate location. If not, the forklift can be re-directed (e.g., autonomously or by prompting a human driver) to the correct drop-off location. Likewise, when a forklift is directed to pick-up a pallet, the system can check that it is in the correct location for the pick-up by comparing a determined location of the forklift to a location identified in a database entry indicating where the pallet was dropped-off.

Figure 1:
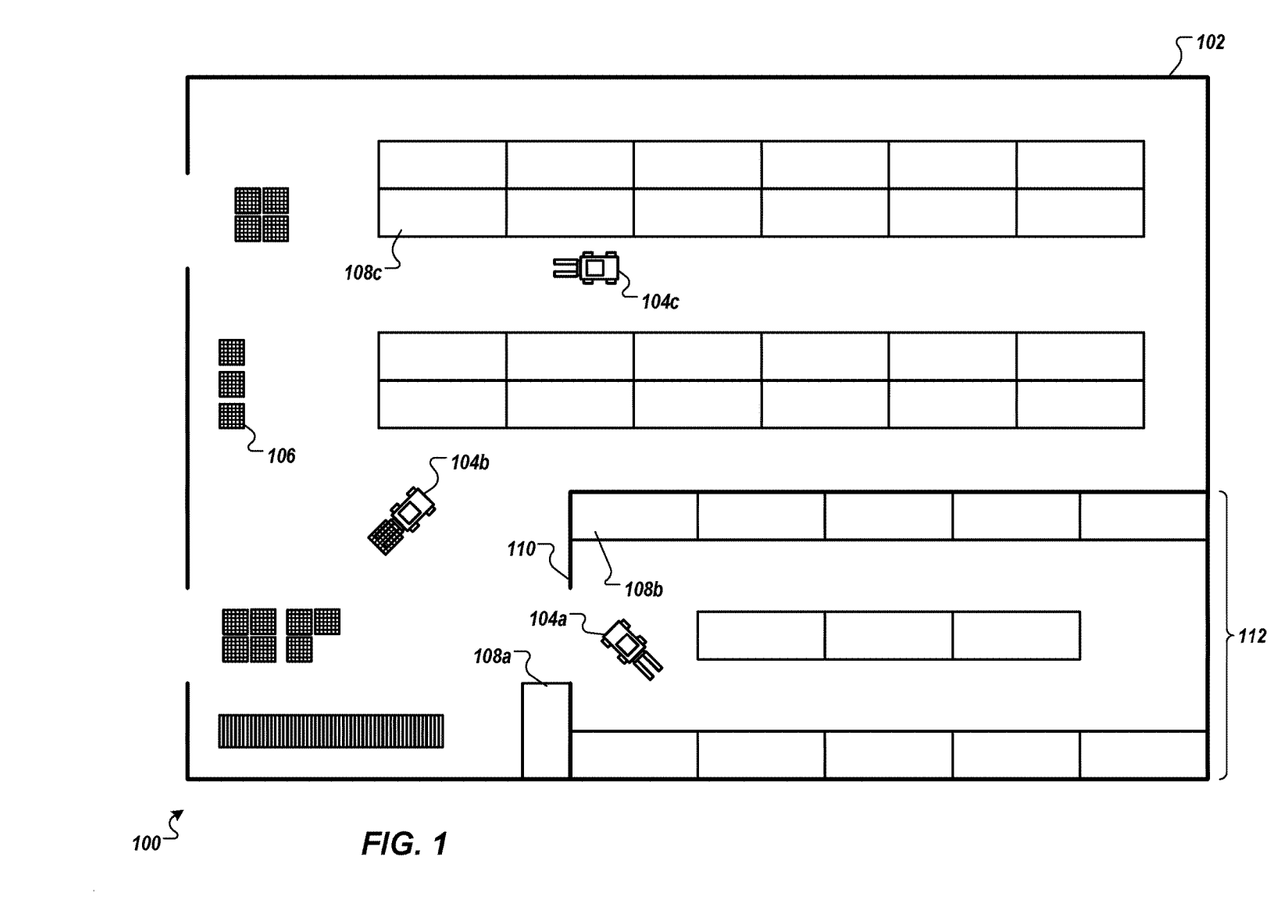
FIG. 1 depicts an example view of a warehouse environment.

FIG. 1 depicts an example view 100 of a warehouse environment 102. The example view 100, for example, is an overhead map view of the warehouse environment 102, and shows a current location of various vehicles (e.g., forklifts 104a, 104b, and 104c) as they move throughout the environment 102. The warehouse environment 102 can include various vehicles that are able to move of their own accord (e.g., the forklifts 104a-c), various movable objects that can be moved throughout the environment 102 (e.g., pallet 106), and various fixed objects that generally do not move throughout the environment 102 (e.g., rack locations 108a, 108b, and 108c). As discussed in further detail below, the warehouse environment 102 can be represented by a spatial model that tracks the location of vehicles, movable objects, and fixed objects within the environment 102 in real time. In some implementations, and as discussed in further detail below, the view 100 of the warehouse environment 102 can be rendered for output by one or more display devices (e.g., display devices described with respect to FIG. 4). For example, each of the forklifts 104a-c can include a mobile computing device (e.g., a tablet device) that displays the view 100. As another example, a central system can include one or more display devices that display the view 100.

Figure 2A:
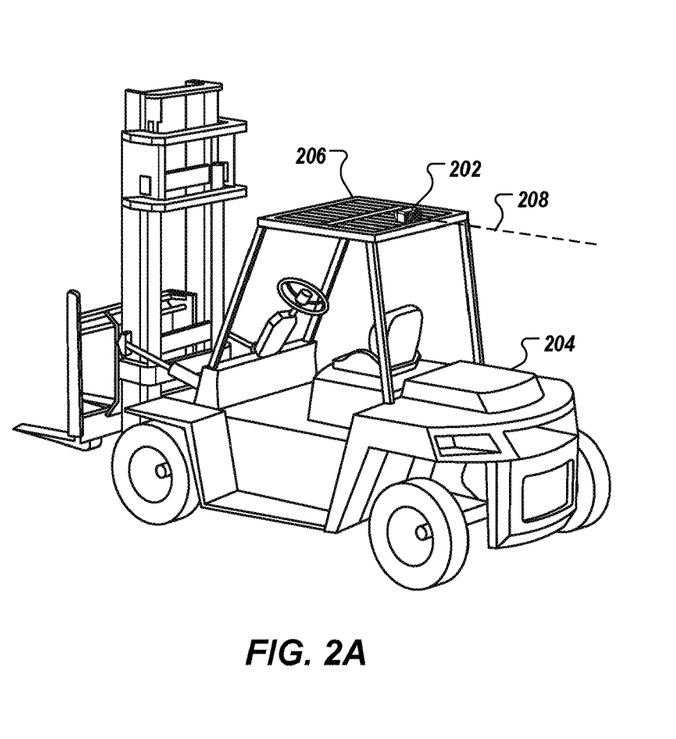
FIGS. 2A-B depict example configurations for affixing stereoscopic cameras to vehicles.
Figure 2B:
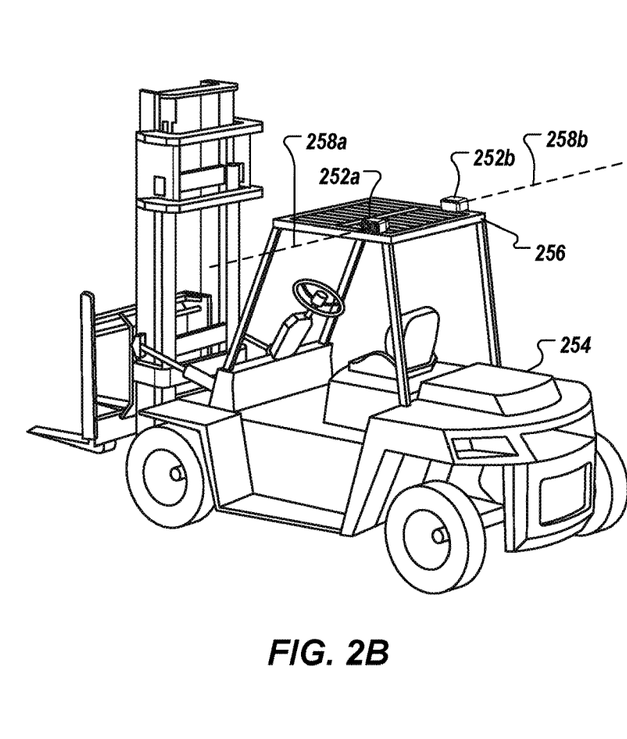

Referring now to FIGS. 2A-2B, example configurations for affixing stereoscopic cameras to vehicles are shown. In general, a stereoscopic camera may include two or more lenses with separate image sensors for each lens, thus allowing the camera to simulate human binocular vision to perceive depth in a scene and relative distances of objects from the camera. In some implementations, the stereoscopic camera can be a digital video camera that captures images in real time at fixed time intervals (e.g., 15 frames per second, 30 frames per second, 60 frames per second, or another suitable time interval). Stereoscopic image data based on the captured images can be provided to a computing device for further processing, for example.

In some implementations, a stereoscopic camera may include one or more enhancements for adapting the camera to a warehouse environment such as a cold storage facility. For example, the stereoscopic camera can include a lens heater to prevent condensation in a cold and/or humid environment. As another example, the camera lenses can be sealed, and/or a desiccant can be used to reduce moisture. As another example, plastic and/or rubber can be included in a camera mounting unit to dampen vibration that may be caused by vehicle movement and to withstand contact from strip curtain flaps. Plastic and/or rubber materials selected for the camera mounting unit can have properties that cause the materials to be resistant to cracking or crumbling and to withstand temperature changes.

FIG. 2A shows an example configuration in which a single stereoscopic camera 202 is affixed to a vehicle (e.g., forklift 204). In the present example, the single stereoscopic camera 202 is affixed to an overhead guard 206 of the forklift 204 (e.g., on top of or underneath the guard) such that the stereoscopic camera 202 is aimed in a direction 208 behind the forklift 204. By pointing the stereoscopic camera 202 behind the forklift 204, for example, images captured by the camera may be unobstructed by the forklift 204 and its operator. However, in some circumstances, a front-facing camera 202 may be appropriate if obstruction from the forklift 204 and its operator can be avoided or accounted for.

FIG. 2B shows an example configuration in which multiple stereoscopic cameras (e.g., stereoscopic cameras 252a and 252b) are affixed to a vehicle (e.g., forklift 254). In the present example, dual stereoscopic cameras 252a and 252b are each affixed to an overhead guard 256 of the forklift 254 (e.g., on top of or underneath the guard) such that the stereoscopic cameras 252a and 252b are aimed in opposite directions. For example, the stereoscopic camera 252a can be pointed to the left of the forklift 254 such that it is aimed in direction 258a, and the stereoscopic camera 252b can be pointed to the right of the forklift 254 such that it is aimed in direction 258b. In some implementations, dual stereoscopic cameras may be positioned such that a field of view of one camera does not overlap with a field of view of another camera. For example, the cameras 252a and 252b can be configured to point in opposite directions, such that an angle formed between the different camera directions is substantially 180 degrees. In some implementations, dual stereoscopic cameras may be positioned such that a field of view of one camera partially overlaps with a field of view of another camera. For example, the camera 252a can be configured to point behind and to the left of the forklift 254, and the camera 252b can be configured to point behind and to the right of the forklift 254, such that an angle formed between the different camera directions is a right or obtuse angle. By pointing the stereoscopic cameras 252a and 252b away from the front of the forklift 254, for example, images captured by each of the cameras may be unobstructed by the forklift 204 and its operator.

Figure 3:
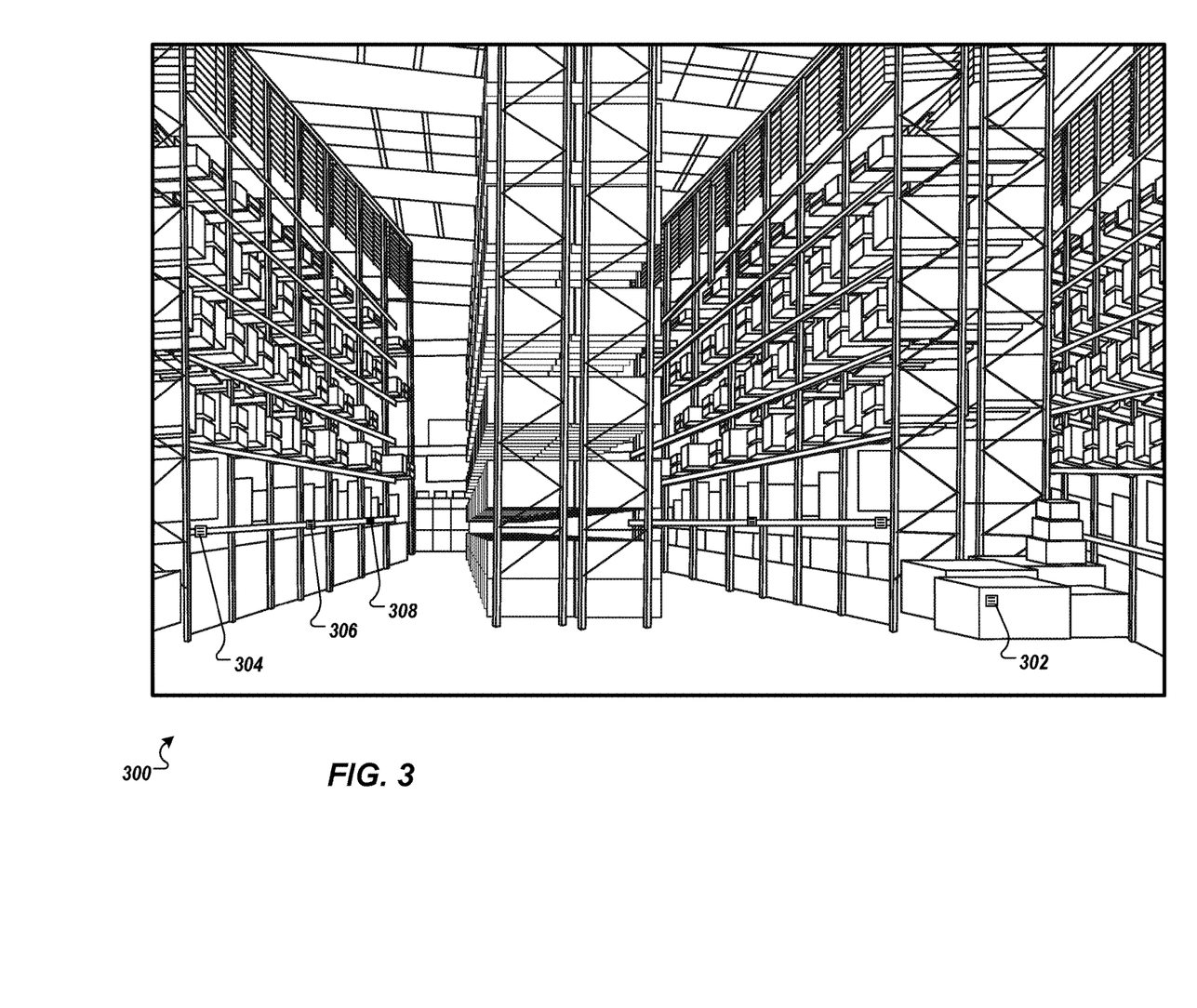
FIG. 3 depicts an example camera view of a warehouse environment.

FIG. 3 depicts an example camera view 300 of a warehouse environment. For example, the example camera view 300 can represent a first image captured by a first lens of a stereoscopic camera. By evaluating image data associated with the first image captured by the first lens of the stereoscopic camera and a second image captured by a second lens of the stereoscopic camera (not shown), a depth of an object within the view, and thus a distance between the camera and the object, can be determined using computer vision techniques and triangulation techniques.

In some implementations, various object identification markers may be used to facilitate object recognition and distance determination. In general, object identification markers can include size, shape, and color properties that are distinctly recognizable by a computer vision system, and/or can include various identification codes which can be linked to particular object instances in a database. For example, an object identification marker can be of a particular size (e.g., one inch across, two inches across, four inches across, or another suitable size), a particular shape (e.g., circle, triangle, square, or another suitable shape), and/or a particular color (e.g., red, green, blue, black/white, or another suitable color) which designates the marker as an identification marker. As another example, an object identification marker can include a particular identification symbol (e.g., letters, numbers, barcodes, QR codes, or another suitable symbol) for identifying a particular object to which the marker is attached. Vehicles, movable objects, and/or fixed objects may have identification markers attached. In the present example camera view 300, an identification marker 302 is shown as being attached to a movable object (e.g., a package, pallet, or another movable object), and identification markers 304, 306, and 308 are shows as being attached to various fixed objects (e.g., rack locations, or other fixed objects). Using computer vision techniques and triangulation techniques, for example, computing devices (e.g., devices described in further detail with respect to FIG. 4) can recognize each of the identification markers 302-308, and can determine distances from a stereoscopic camera to each of the markers.

Figure 4:
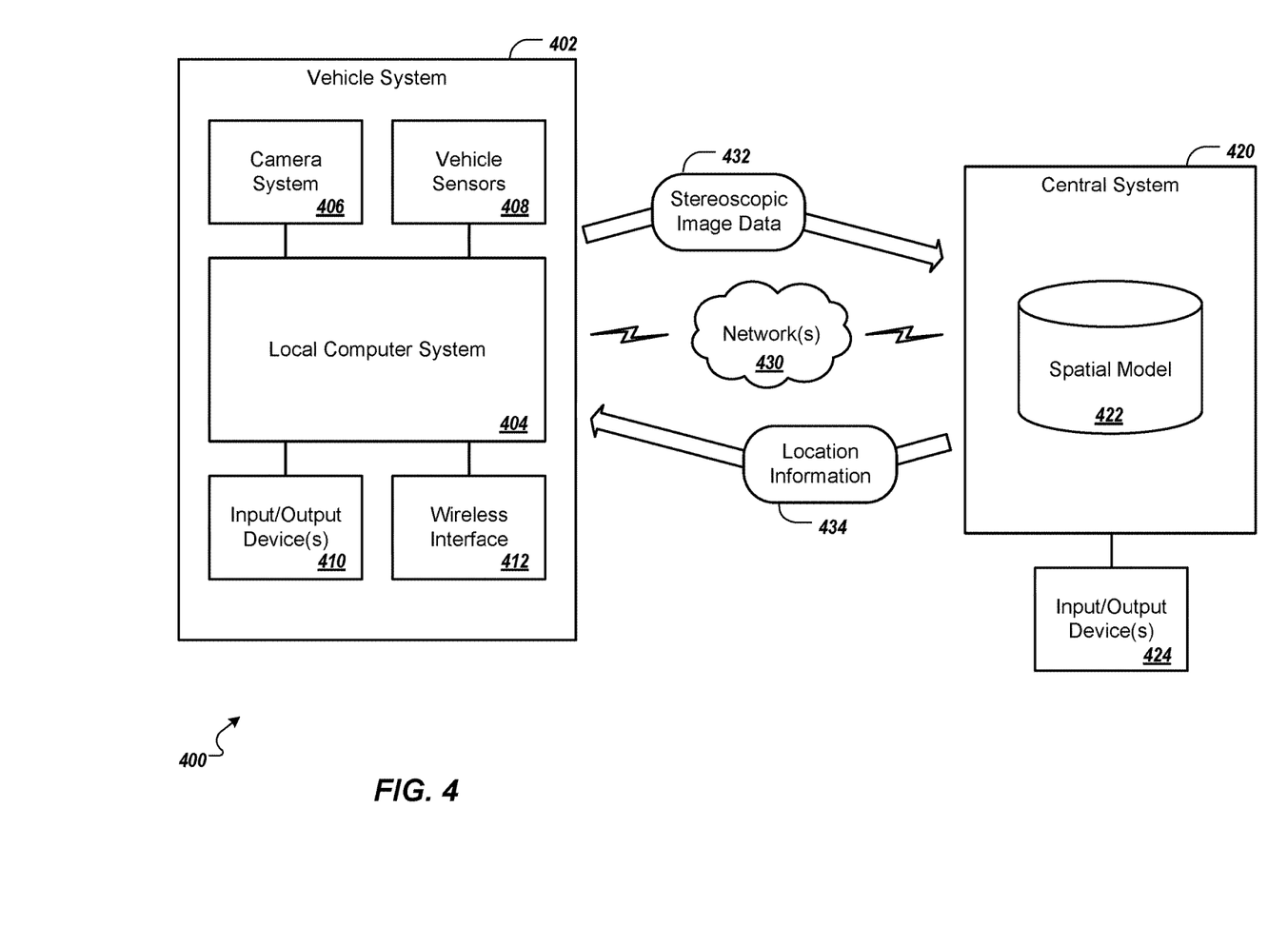
FIG. 4 is a block diagram of an example system for determining a location of a vehicle in an environment.

Referring now to FIG. 4, a block diagram of an example system 400 for determining a location of a vehicle in an environment is shown. The example system 400 includes a vehicle system 402 which includes multiple subsystems and components for sensing environmental conditions, for receiving, processing, and transmitting sensor data, and for receiving and processing spatial model information from a central system 420. The subsystems and components of the vehicle system 402, for example, can be integrated with a vehicle (e.g., a forklift, or another sort of manually operated or autonomous vehicle and/or robot), communicatively coupled with the vehicle, and/or transported by the vehicle.

The vehicle system 402, for example, includes a local computer system 404, which can be communicatively coupled with (e.g., using wired and/or wireless connections) a camera system 406, one or more vehicle sensors 408, one or more input/output devices 410, and a wireless interface 412. The local computer system 404, for example, can include one or more processors, memory devices, storage devices, and communication ports for receiving, processing, and transmitting data. In some implementations, the local computer system can be or include a mobile computing device such as tablet computer or another suitable mobile computing device. The camera system 406, for example, can include one or more stereoscopic cameras. The vehicle sensors 408, for example, can include one or more sensors that can monitor conditions of the vehicle and/or the vehicle's environment. In some implementations, the vehicle sensors can be connected to a vehicle bus, which can also be connected to the local computer system 404. For example, a vehicle bus (e.g., a forklift bus) can include a load sensor that detects a load carried by the vehicle, vehicle battery level sensors, accelerometers, diagnostic plugins, and other suitable vehicle sensors. The input/output devices 410, can include various input devices (e.g., touchscreens, microphones, pointing devices, keyboards, scanners, and other suitable input devices), and various output devices (e.g., display screens, speakers, tactile output devices, and other suitable output devices). The wireless interface 412, for example, can include a communication interface for wireless communication with other vehicle systems and/or the central system 420 using one or more long-range and/or short-range communication protocols.

The central system 420 can include one or more computer servers and one or more databases. For example, the central system 420 can be or include various types of servers including, but not limited to, an application server, a web server, a web server, a proxy server, or a server farm. In the present example, the central system 420 maintains a spatial model 422. The spatial model 422, for example, can be implemented as a point cloud system in which data points are defined in a three-dimensional coordinate system using X, Y, and Z coordinates. Various objects in a warehouse environment, for example, can be represented in the spatial model 422, and corresponding locations of the objects can be tracked using the three-dimensional coordinate system (e.g., using a Simultaneous Location and Mapping (SLAM) algorithm). The central system 420 can also include and/or communicate with one or more input/output devices 424. The input/output devices 424, can include various input devices (e.g., touchscreens, microphones, pointing devices, keyboards, scanners, and other suitable input devices), and various output devices (e.g., display screens, speakers, tactile output devices, and other suitable output devices).

Communication between the vehicle system 402 and the central system 420 can occur over one or more networks 430. Examples of the network(s) 430 include a local area network (LAN), a wide area network (WAN), and the Internet. In the present example, stereoscopic image data 432 based on images captured by the camera system 406 is provided by the vehicle system 402 over the network(s) 430 to the central system 420. After receiving the stereoscopic image data 432, for example, the central system 420 can reference the stereoscopic image data 432 and the spatial model 422, and provide location information 434 to the vehicle system 402 that corresponds to a current position of the vehicle in an environment.

In some implementations, at least a portion of the spatial model 422 may be maintained by the local computer system 404. For example, the central system 420 can provide a portion of the spatial model 422 to the vehicle system 402 that corresponds to a predetermined area surrounding the vehicle, along with the location information. While the vehicle is in the predetermined area, for example, the vehicle system 402 can use the local computer system 404 to determine a current location of the vehicle without sending stereoscopic image data 432 to the central system. By maintaining a partial spatial model, for example, a location of the vehicle can be quickly determined, and/or can be determined without a continuous connection to the network(s) 430.

In some implementations, the stereoscopic image data 432 may include raw image data captured by the camera system 406. In some implementations, preprocessing of raw image data captured by the camera system 406 may be performed by the local computer system 404, and the stereoscopic image data 432 may include preprocessed image data. For example, the local computer system 404 can perform object recognition techniques on the raw image data captured by the camera system 406, can determine relative distances between the vehicle and the recognized objects, and can provide stereoscopic image data 432 that includes identifiers of recognized objects and relative distances to the objects. By providing preprocessed image data, for example, an amount of data provided over the network(s) 430 between the vehicle system 402 and the central system 420 can be reduced, thus conserving bandwidth.

Figure 5:
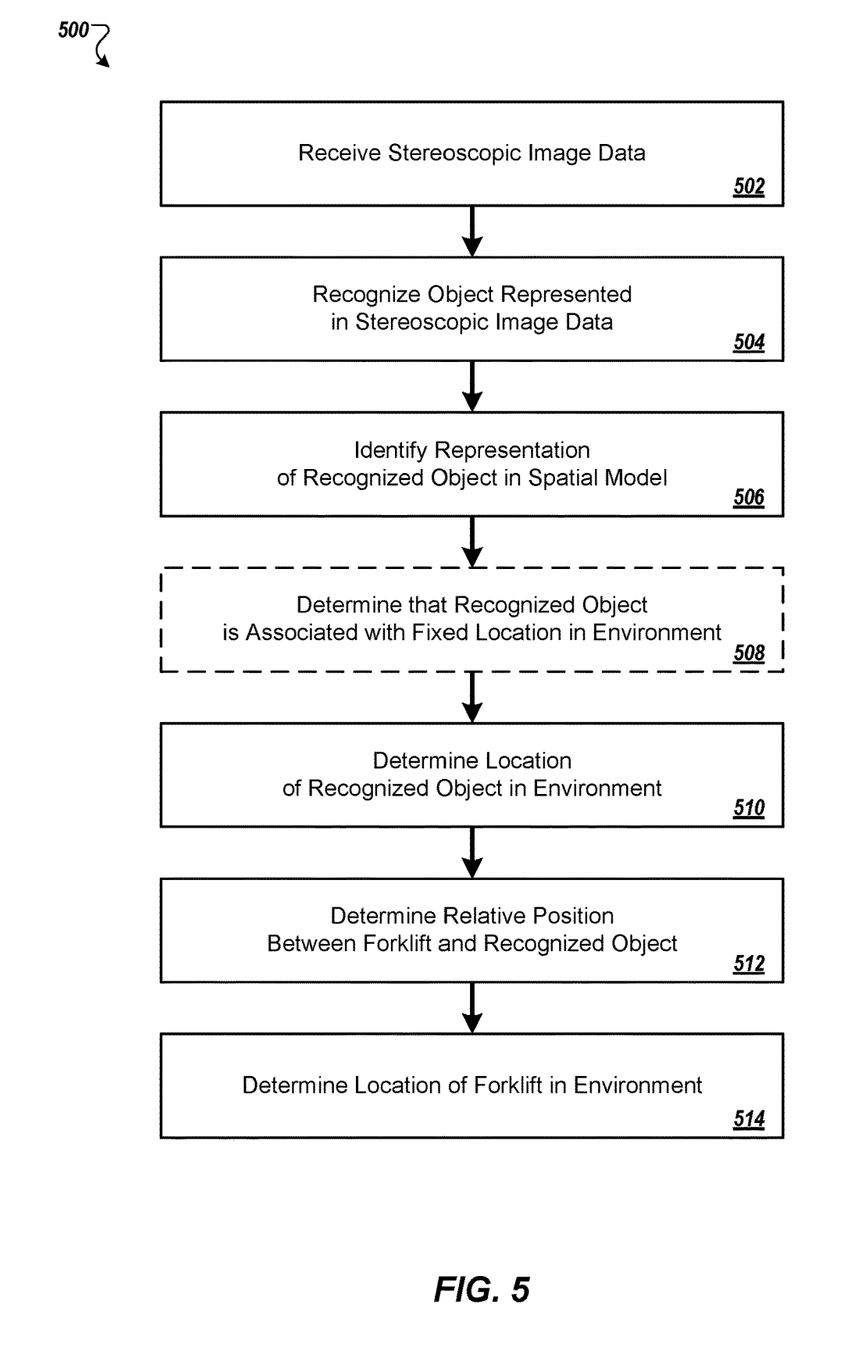
FIGS. 5-6 are flowcharts of example techniques for determining a location of a vehicle in an environment.

FIG. 5 is a flowchart of an example technique 500 for determining a location of a vehicle in an environment. The vehicle can be a forklift, for example, however the example technique 500 can also be used for determining the location of other sorts of manually operated and autonomous vehicles and/or robots in an environment (e.g., a warehouse environment). The example technique 500 can be performed by any of a variety of appropriate systems, such as the system 400 (shown in FIG. 4).

Stereoscopic image data is received (502). The stereoscopic image data can be based on at least one stereoscopic image that was captured by a stereoscopic camera that is affixed to a vehicle (e.g., a forklift). For example, the vehicle system 402 (shown in FIG. 4) can capture an image of its environment using the camera system 406. The vehicle system 402 can provide the stereoscopic image data 432 to the central system 420 over the network(s) 430 using the wireless interface 412. Optionally, the stereoscopic image data 432 may be received and preprocessed by the local computer system 404 prior to sending the data over the network(s) 430.

In some implementations, stereoscopic image data may be based on a series of stereoscopic images received in real time as the images are captured by a stereoscopic camera. For example, the camera system 406 can be a digital stereoscopic video camera that captures images in real time at fixed time intervals (e.g., 15 frames per second, 30 frames per second, 60 frames per second, or another suitable time interval). The stereoscopic image data 432, for example, may be provided at time intervals that correspond to a frame rate of the digital stereoscopic video camera that captures the images, or may be provided at less frequent time intervals. For example, the vehicle system 402 can receive stereoscopic images from the camera system 406 in accordance with a frame rate of the stereoscopic camera, and can provide raw or preprocessed stereoscopic image data 432 at less frequent intervals (e.g., twice per second, once per second, every other second), or at another suitable time interval by skipping frames. By providing stereoscopic image data at an interval that is less frequent than a frame rate of a stereoscopic camera that captures the images, for example, an amount of data provided over the network(s) 430 between the vehicle system 402 and the central system 420 can be reduced, thus conserving bandwidth.

An object that is represented in the stereoscopic image data is recognized (504). For example, the local computer system 404 and/or the central system 420 can perform object recognition techniques to identify the object. Object recognition techniques, for example, may include appearance-based methods (e.g., edge matching, greyscale matching, gradient matching, modelbases, or other suitable appearance-based methods), feature-based methods (e.g., interpretation trees, pose clustering, geometric hashing, invariance methods, or other suitable feature-based methods), and/or genetic algorithms. In some implementations, object recognition techniques may be facilitated by object identification markers attached to vehicles, movable objects, and/or fixed objects within an environment. Referring to FIG. 3, for example, the example camera view 300 of a warehouse environment shows various object identification markers (e.g., markers 302-308). The object recognition techniques, for example, can be optimized for recognition of the type of marker selected for use within the environment.

A representation of the recognized object is identified in a spatial model (506). Referring again to FIG. 4, for example, the local computer system 404 and/or the central system 420 can reference the spatial model 422 (or a local portion of the spatial model) and can identify a representation of the recognized object in the model. In general, the spatial model 422 can identify, for each of a plurality of objects in an environment, a corresponding location of the object in the environment. For example, as the vehicle system 402 (and other vehicle systems) move throughout the environment, images of objects (e.g., vehicles, movable objects, and fixed objects) can be captured, the objects can be recognized, locations of the objects can be determined, and the spatial model 422 can be updated to reflect current object locations. Over time, the spatial model 422 can be refined, for example, such that particular objects are associated with permanence values that reflect a likelihood of whether the object is a movable or fixed object in the environment.

The technique 500 may optionally include determining that the recognized object is associated with a fixed location in the environment (508). For example, the local computer system 404 and/or the central system 420 can reference the spatial model 422 (or a local portion of the spatial model) and location history and/or a permanence data value associated with the recognized object to determine whether the object is a vehicle, movable, or fixed object.

In some implementations, determining that the recognized object is associated with a fixed location in the environment includes determining that the object's location has not changed for a predetermined length of time. For example, the spatial model 422 can track observation times and locations for each object recognized within the environment. When the location of an object has not changed for a predetermined length of time (e.g., a week, a month, three months, or another suitable length of time), the object can be designated as having a fixed location. As another example, the object can be assigned a permanence value that is proportional to an amount of time that the object has been at a location, such that objects that have been at a same location for a short duration can be assigned a low permanence value, and objects that have been at a same location for a long duration can be assigned a high permanence value.

In some implementations, determining that the recognized object is associated with a fixed location in the environment includes determining that the recognized object has been designated as a fixed location object. For example, the spatial model 422 can associate an object identifier for a recognized object with a data value (e.g., a flag) that designates the object as having a fixed location. Referring to FIG. 3, for example, each of the identification markers 304, 306, and 308 (e.g., identification markers attached to rack locations) may be flagged as fixed location objects in the spatial model 422, whereas the identification marker 302 (e.g., an identification marker attached to a package or pallet) may not be flagged.

A location of the recognized object in the environment is determined, as indicated by the spatial model (510). Referring again to FIG. 4, for example, the local computer system 404 and/or the central system 420 can reference the spatial model 422 (or a local portion of the spatial model) and determine a current location of the recognized object according to the model. In some implementations, locations of recognized objects may be determined only for objects that have been designated as fixed location objects. In some implementations, locations of recognized objects may be determined only for objects that have permanence values that meet a predetermined threshold value (e.g., objects having relatively high permanence values). In some implementations, locations of multiple recognized objects may be determined.

A relative position between the vehicle (e.g., the forklift) and the recognized object is determined, based on a portion of the received stereoscopic image data that represents the recognized object (512). For example, the local computer system 404 and/or the central system 420 can use computer vision techniques (e.g., including triangulation techniques that rely on differences in an object's position in corresponding stereoscopic images) to analyze a stereoscopic image pair, and can determine a relative position between the vehicle and the recognized object. In some implementations, known properties (e.g., size and shape properties) of an object identification marker can be used to enhance computer vision techniques used to determine the relative position. For example, if a given identification marker were known to have a particular size (e.g., four square inches) and to be of a particular shape (e.g., square), these object properties may be used as a factor, along with computer vision techniques for determining distances to objects, to more accurately determine the relative position between the vehicle and the identification marker.

A location of the vehicle (e.g., the forklift) in the environment is determined, based on the determined location of the recognized object in the environment, and the determined relative position between the vehicle and the recognized object (514). For example, the local computer system 404 and/or the central system 420 can determine and plot a location of the vehicle in the environment, based on the determined locations of one or more recognized objects and their relative positions to the vehicle. Referring to FIG. 1, for example, based on a determined location of the rack location 108b (e.g., a fixed location object), and a determined relative location between the forklift 104a and the rack location 108b, a location of the forklift 104a can be determined and plotted on the view 100.

In some implementations, the view 100 can be provided by a display device of the vehicle system 402 (e.g., one of the input/output devices 410), and/or by a display device of the central system 420 (e.g., one of the input/output devices 424), shown in FIG. 4. For example, the display device can be included with the vehicle system 402, and can provide a real time view of the environment as vehicles and movable objects move throughout the environment. When a route is assigned to a vehicle, for example, the view 100 presented by its display device can be updated to indicate the assigned route (e.g., by displaying a line that indicates a path along the route). In some implementations, the display device can present additional information relevant to a route and/or delivery. For example, the additional information can include information about a pallet or one or more packages transported by a vehicle.

In some implementations, a display device may also serve as an input device (e.g., a touchscreen) and operator input may be received and used to facilitate locating a vehicle in an environment. For example, if a technique for determining vehicle location fails or produces an uncertain location, the operator can be prompted through the display device to provide guidance to the system 400. The operator, for example, can select a general area in the view 100 in which the vehicle is located, and the system 400 can then use a portion of the spatial model 422 that is local to the operator's selection when determining a precise location of the vehicle.

In some implementations, one or more environmental signals may be received and used to determine a macro location area of a vehicle (e.g., a general estimated location of the vehicle in an environment), and a portion of a spatial model that corresponds to the macro location can be used when determining a micro location (e.g., a precise location of the vehicle in the environment) based on stereoscopic image data. Environmental signals used for determining the macro location of the vehicle, for example, can include one or more Wi-Fi strength signals, magnetic signals, sound signals (e.g., sonar), and/or light signals (e.g., including particular colors, frequencies, and/or flicker patterns). A macro location, for example, can be a general area on the order of 5-10 cubic meters, and can determined based on receipt of one or more environmental signals that are known to correspond to and/or occur at the macro location. A micro location, for example, can be a precise location on the order of 0.5-1.0 cubic centimeters, and can be determined by using the received stereoscopic image data 432 to analyze only a portion of the spatial model 422 that corresponds to the determined macro location. By determining a macro location, limiting a portion of a spatial model for analysis, and then determining a micro location, for example, processing times may be significantly decreased and location confidences may be significantly increased, as a number of calculations is reduced.

For example, a Wi-Fi strength signal may be received from at least one Wi-Fi access point, and determining the location of the vehicle (e.g., the forklift) in the environment may be based at least in part on the Wi-Fi strength signal. The wireless interface 412 of the vehicle system 402 (shown in FIG. 4) can determine strength signals from one or more Wi-Fi access points distributed throughout a warehouse environment, for example, and can provide the strength signals to the local computer system 404 and/or the central system 420, which can maintain known locations of the WiFi access points and can provide an estimated location of the vehicle based on the strength signals. For example, strength signals from multiple Wi-Fi access points can be triangulated to provide the estimated location of the vehicle. The estimated location, for example, can be used to identify a portion of the spatial model 422 for analysis when determining a location of the vehicle in the environment, thus facilitating location determination while conserving processing resources.

In some implementations, while a vehicle is within a predefined area associated with a recognized object that is associated with a fixed location in the environment, determining locations of further recognized objects in the environment may include processing only a portion of the spatial model that corresponds to the predefined area. Referring to FIG. 1, for example, the forklift 104*a* can pass within range of fixed location object 110 (e.g., the forklift passes through a doorway), which can be recognized by the local computer system 404 and/or the central system 420 (shown in FIG. 4) as being associated with a section 112 of the environment 102 (e.g., a particular room in a warehouse). Techniques for determining when a vehicle enters and/or exits the section of the environment (e.g., the room in a warehouse) may include detecting one or more environmental signals using sensors other than a stereoscopic camera (e.g., detecting one or more Wi-Fi strength signals, magnetic signals, sound signals, and/or light signals), and/or may be based on stereoscopic image data. For example, the fixed location object 110 can be marked with one or more object identification markers (e.g., including letters, numbers, barcodes, QR codes, or other suitable symbols) for identifying the fixed location object 110 as a doorway to the section 112 (e.g., the room in the environment 102), which can be identified based on stereoscopic image data as the forklift 104*a* passes through the doorway. In the present example, while the forklift 104*a* is within the section 112 of the environment 102 (e.g., until such time that the forklift again passes through the doorway), a portion of the spatial model 422 that is associated with the section 112 can be used for analysis when determining a location of the forklift 104*a* in the environment 102, thus facilitating location determination while conserving processing resources.

Figure 6:
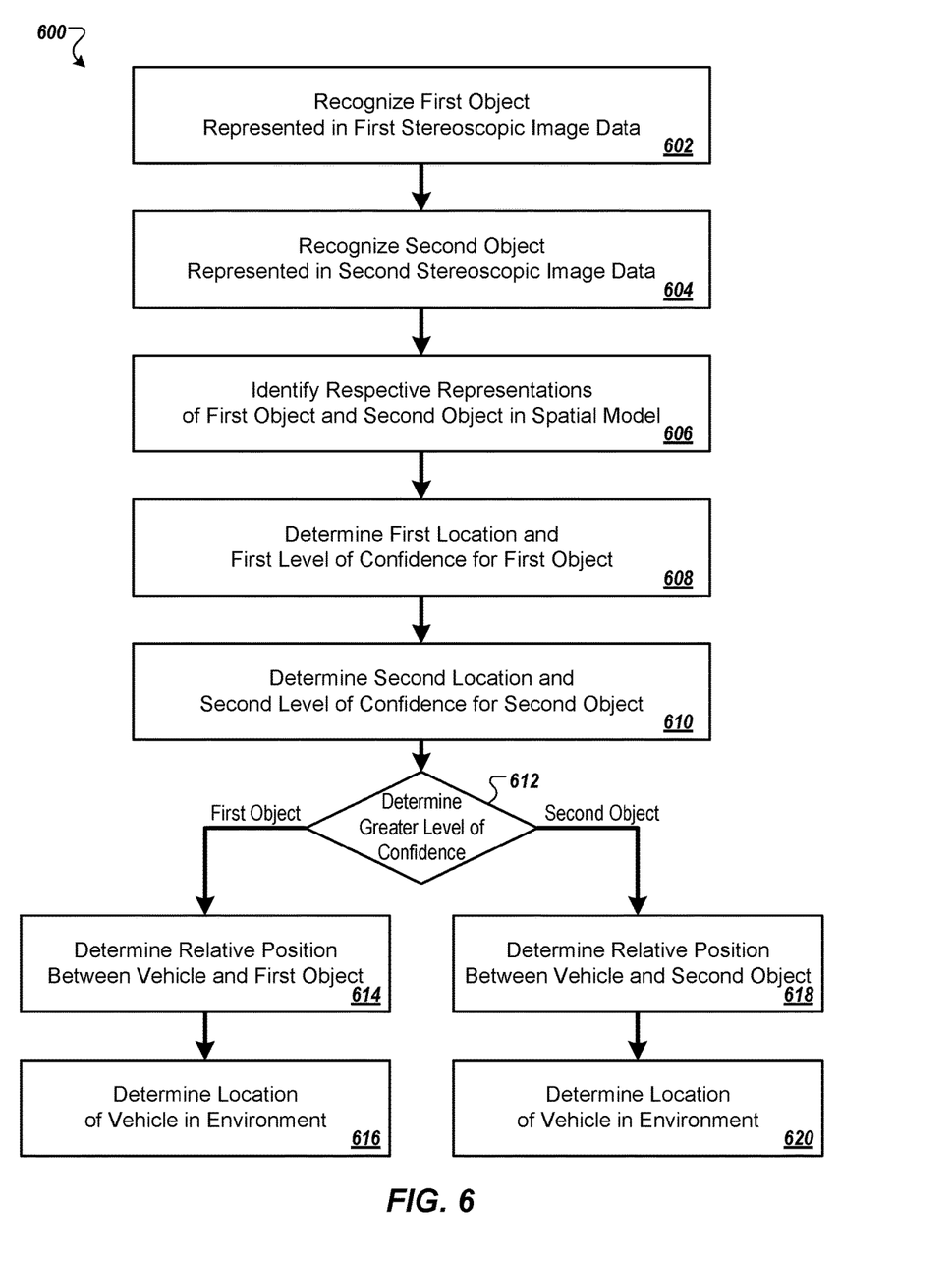

FIG. 6 is a flowchart of an example technique 600 for determining a location of a vehicle in an environment. The vehicle can be a forklift, for example, however the example technique 600 can also be used for determining the location of other sorts of manually operated and autonomous vehicles and/or robots in an environment (e.g., a warehouse environment). The example technique 600 can be performed by any of a variety of appropriate systems, such as the system 400 (shown in FIG. 4).

A first object that is represented in first stereoscopic image data is recognized, based on one or more stereoscopic images received from a first stereoscopic camera that has been affixed to a vehicle (602). For example, the vehicle system 402 (shown in FIG. 4) can capture an image of its environment using the camera system 406, and can provide the stereoscopic image data 432 to the central system 420 over the network(s) 430 using the wireless interface 412. Optionally, the stereoscopic image data 432 may be received and preprocessed by the local computer system 404 prior to sending the data over the network(s) 430. The local computer system 404 and/or the central system 420 can perform object recognition techniques to identify the first object. Referring now to FIG. 2B, for example, the stereoscopic camera 252*a* (e.g., part of the camera system 406) affixed to the forklift 254 can capture images of one or more objects to the left of the forklift 254, and the object(s) can then be recognized.

A second object that is represented in second stereoscopic image data is recognized, based on one or more stereoscopic images received from a second stereoscopic camera that has been affixed to the vehicle (604). For example, the vehicle system 402 (shown in FIG. 4) can capture an image of its environment using the camera system 406, and can provide the stereoscopic image data 432 to the central system 420 over the network(s) 430 using the wireless interface 412. Optionally, the stereoscopic image data 432 may be received and preprocessed by the local computer system 404 prior to sending the data over the network(s) 430. The local computer system 404 and/or the central system 420 can perform object recognition techniques to identify the second object. Referring again to FIG. 2B, for example, the stereoscopic camera 252b (e.g., part of the camera system 406) affixed to the forklift 254 can capture images of one or more objects to the right of the forklift 254, and the object(s) can then be recognized.

Respective representations of the first object and the second object are identified in a spatial model (606). Referring to FIG. 4, for example, the local computer system 404 and/or the central system 420 can reference the spatial model 422 (or a local portion of the spatial model) and can identify representations of the first object and the second object in the model. In general, the spatial model 422 can track, for each of a plurality of objects, a corresponding location in an environment and a level of confidence that the corresponding location is the object's actual location. For example, as the vehicle system 402 (and other vehicle systems) move throughout the environment, images of objects (e.g., vehicles, movable objects, and fixed objects) can be captured, the objects can be recognized, locations of the objects can be determined, and the spatial model 422 can be updated to reflect current object locations. Over time, the spatial model 422 can be refined, for example, such that each recognized object is associated with a level of confidence that a determined location for the object is the object's actual location. For example, the local computer system 404 and/or the central system 420 can reference the spatial model 422 (or a local portion of the spatial model) and location history and/or a permanence data value associated with the recognized object to determine a level of confidence for the recognized object's determined location.

In some implementations, a level of confidence that a corresponding location is an object's actual location may be proportional to an amount of time that the object has been at the corresponding location, according to a spatial model. For example, the spatial model 422 can track observation times and locations for each object recognized within the environment. The object can be associated with a level of confidence that is proportional to an amount of time that the object has been at a location, such that objects that have been at a same location for a short duration can be associated with a low level of confidence, and objects that have been at a same location for a long duration can be associated with a high level of confidence.

In some implementations, a level of confidence that a corresponding location is an object's actual location may be a highest level of confidence when the object has been designated as a fixed location object. For example, the spatial model 422 can associate an object identifier for a recognized object with a data value (e.g., a flag) that designates the object as having a fixed location. Referring now to FIG. 1, for example, the object 110 (e.g., a door frame) may be designated as fixed location object in the spatial model 422, whereas the pallet 106 may not receive such a designation. In the present example, the fixed location object 110 can have a highest level of confidence that a determined location of the object from the spatial model 422 is the object's actual location.

A first location of the first object in the environment and a first level of confidence that the first location is the first object's actual location are determined, according to the spatial model (608). Referring to FIG. 4, for example, the local computer system 404 and/or the central system 420 can reference the spatial model 422 (or a local portion of the spatial model) and determine a current location of the first recognized object according to the model, along with a first level of confidence that the first location is the first object's actual location. Referring now to FIG. 1, for example, the forklift 104b can capture an image of fixed location object 110 (e.g., using a left-directed stereoscopic camera), a location of the object 110 can be determined in the environment 102, and a first level of confidence (e.g., a high level of confidence) can be determined that the location is the object's actual location.

A second location of the second object in the environment and a second level of confidence that the second location is the second object's actual location are determined, according to the spatial model (610). Referring to FIG. 4, for example, the local computer system 404 and/or the central system 420 can reference the spatial model 422 (or a local portion of the spatial model) and determine a current location of the second recognized object according to the model, along with a second level of confidence that the second location is the second object's actual location. Referring now to FIG. 1, for example, the forklift 104b can capture an image of a movable object such as the pallet 106 (e.g., using a right-directed stereoscopic camera), a location of the pallet 106 can be determined in the environment 102, and a second level of confidence (e.g., a low level of confidence) can be determined that the location is the object's actual location.

At 612, the first level of confidence and the second level of confidence are evaluated. For example, a first level of confidence that the determined location of the object 110 (e.g., a door frame) is the object's actual location can be evaluated against a second level of confidence that the determined location of the object 106 (e.g., a pallet).

At 614, in response to determining that the first level of confidence for the first object's location is greater than the second level of confidence for the second object's location, a relative position between the vehicle and the first object is determined, based on a portion of the first stereoscopic image data that represents the first object. For example, in response to determining that the level of confidence for the location of the object 110 is greater than the level of confidence for the location of the object 106, a relative position between the vehicle and the object 110 can be determined.

At 616, a location of the vehicle in the environment is determined, based on the determined first location of the first object in the environment, and the determined relative position between the vehicle and the first object. For example, a location of the forklift 104b can be determined in the environment 102, based on the determined location of the object 110 and the determined relative position between the forklift 104b and the object 110.

At 618, in response to determining that the second level of confidence for the second object's location is greater than the first level of confidence for the first object's location, a relative position between the vehicle and the second object is determined, based on a portion of the second stereoscopic image data that represents the second object. For example, if the level of confidence for the location of the object 106 were to be greater than the level of confidence for the location of the object 110, a relative position between the vehicle and the object 106 could be determined.

At 620, a location of the vehicle in the environment is determined, based on the determined second location of the second object in the environment, and the determined relative position between the vehicle and the second object. For example, a location of the forklift 104b can be determined in the environment 102, based on the determined location of the object 106 and the determined relative position between the forklift 104b and the object 106.

In some implementations, a Wi-Fi strength signal may be received from at least one Wi-Fi access point, and determining the location of the vehicle in the environment may be based at least in part on the Wi-Fi strength signal. For example, the wireless interface 412 of the vehicle system 402 (shown in FIG. 4) can determine strength signals from one or more Wi-Fi access points distributed throughout a warehouse environment, and can provide the strength signals to the local computer system 404 and/or the central system 420, which can maintain known locations of the WiFi access points and can provide an estimated location of the vehicle based on the strength signals. The estimated location, for example, can be used to identify a portion of the spatial model 422 for analysis when determining a location of the vehicle in the environment, thus facilitating location determination while conserving processing resources.

Figure 7:
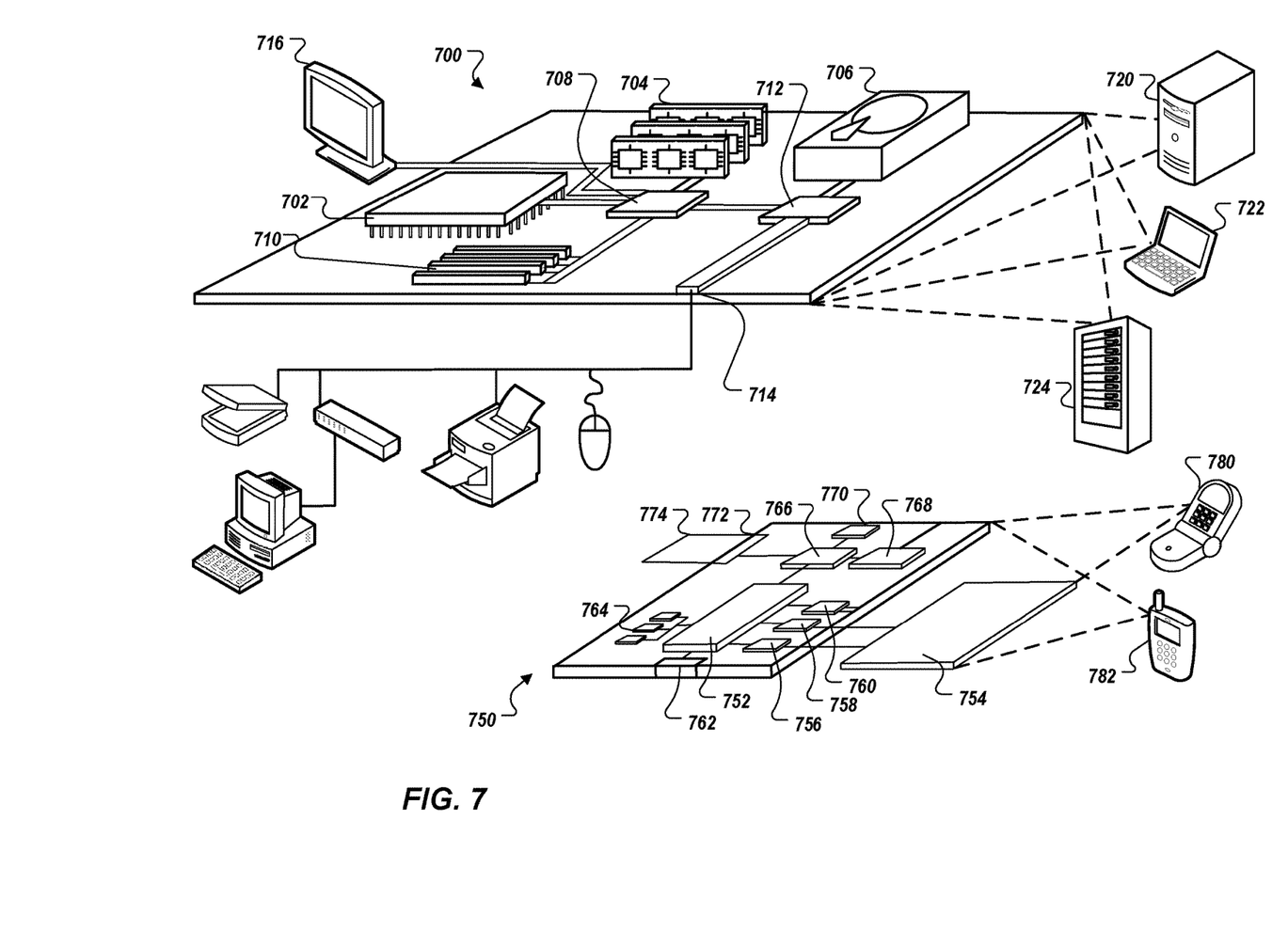
FIG. 7 is a block diagram of example computing devices that may be used to implement the systems and methods described in this document.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally, computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
    recognizing a first object that is represented in first stereoscopic image data based on one or more stereoscopic images received from a first stereoscopic camera that has been affixed to a vehicle;
    recognizing a second object that is represented in second stereoscopic image data based on one or more stereoscopic images received from a second stereoscopic camera that has been affixed to the vehicle;
    identifying respective representations of the first object and the second object in a spatial model that tracks, for each of a plurality of objects, a corresponding location in an environment and a level of confidence that the corresponding location is the object's actual location;
    determining a first location of the first object in the environment and a first level of confidence that the first location is the first object's actual location, according to the spatial model;
    determining a second location of the second object in the environment and a second level of confidence that the second location is the second object's actual location, according to the spatial model; and
    in response to determining that the first level of confidence for the first object's location is greater than the second level of confidence for the second object's location:
        determining a relative position between the vehicle and the first object, based on a portion of the first stereoscopic image data that represents the first object; and
        determining a location of the vehicle in the environment, based on the determined first location of the first object in the environment, and the determined relative position between the vehicle and the first object.

2. The computer-implemented method of claim 1, wherein a level of confidence that a corresponding location is an object's actual location is proportional to an amount of time that the object has been at the corresponding location, according to the spatial model.

3. The computer-implemented method of claim 1, wherein a level of confidence that a corresponding location is an object's actual location is a highest level of confidence when the object has been designated as a fixed location object.

4. The computer-implemented method of claim 1, further comprising:
    receiving, from at least one environmental sensor other than the stereoscopic camera, an environmental signal, wherein determining the location of the vehicle within the environment is based at least in part on the environmental signal.

5. The computer-implemented method of claim 3, wherein the object is designated as a fixed location object when the object's location has not changed for a predetermined length of time.

6. The computer-implemented method of claim 3, further comprising:
    while the vehicle is within a predefined area associated with the fixed location object, determining locations of further recognized objects in the environment, including processing only a portion of the spatial model that corresponds to the predefined area.

7. The computer-implemented method of claim 1, wherein the first and second stereoscopic image data are each based on a respective series of stereoscopic images received in real time as the images are captured by the first and second stereoscopic cameras, each stereoscopic image being captured at a fixed time interval.

8. A system, comprising:
    a vehicle;
    a first stereoscopic camera affixed to the vehicle;
    a second stereoscopic camera affixed to the vehicle; and
    a computing device communicatively coupled to each of the first and second stereoscopic cameras, the computing device configured to perform operations comprising:
        recognizing a first object that is represented in first stereoscopic image data based on one or more stereoscopic images received from a first stereoscopic camera that has been affixed to a vehicle;
        recognizing a second object that is represented in second stereoscopic image data based on one or more stereoscopic images received from a second stereoscopic camera that has been affixed to the vehicle;
        identifying respective representations of the first object and the second object in a spatial model that tracks, for each of a plurality of objects, a corresponding location in an environment and a level of confidence that the corresponding location is the object's actual location;
        determining a first location of the first object in the environment and a first level of confidence that the first location is the first object's actual location, according to the spatial model;
        determining a second location of the second object in the environment and a second level of confidence that the second location is the second object's actual location, according to the spatial model; and
        in response to determining that the first level of confidence for the first object's location is greater than the second level of confidence for the second object's location:
            determining a relative position between the vehicle and the first object, based on a portion of the first stereoscopic image data that represents the first object; and
            determining a location of the vehicle in the environment, based on the determined first location of the first object in the environment, and the determined relative position between the vehicle and the first object.

9. The system of claim 8, wherein the vehicle is a forklift.

10. The system of claim 9, wherein the first and second stereoscopic cameras are each affixed to an overhead guard of the forklift such that the first stereoscopic camera points away from the forklift and to a side of the forklift and the second stereoscopic camera points away from the forklift and to an opposite side of the forklift.

11. The system of claim 10, wherein the first and second stereoscopic cameras each include a lens heater.

12. The system of claim 8, the operations further comprising:
receiving, from at least one environmental sensor other than the stereoscopic camera, an environmental signal, wherein determining the location of the vehicle within the environment is based at least in part on the environmental signal.

13. The system of claim 8, wherein the first and second stereoscopic image data are each based on a respective series of stereoscopic images received in real time as the images are captured by the first and second stereoscopic cameras, each stereoscopic image being captured at a fixed time interval.

14. A non-transitory computer-readable storage medium having instructions stored thereon which, when executed by one or more processors, cause the one or more processors to perform operations comprising:
recognizing a first object that is represented in first stereoscopic image data based on one or more stereoscopic images received from a first stereoscopic camera that has been affixed to a vehicle;
recognizing a second object that is represented in second stereoscopic image data based on one or more stereoscopic images received from a second stereoscopic camera that has been affixed to the vehicle;
identifying respective representations of the first object and the second object in a spatial model that tracks, for each of a plurality of objects, a corresponding location in an environment and a level of confidence that the corresponding location is the object's actual location;
determining a first location of the first object in the environment and a first level of confidence that the first location is the first object's actual location, according to the spatial model;
determining a second location of the second object in the environment and a second level of confidence that the second location is the second object's actual location, according to the spatial model; and
in response to determining that the first level of confidence for the first object's location is greater than the second level of confidence for the second object's location:
determining a relative position between the vehicle and the first object, based on a portion of the first stereoscopic image data that represents the first object; and
determining a location of the vehicle in the environment, based on the determined first location of the first object in the environment, and the determined relative position between the vehicle and the first object.

15. The non-transitory computer-readable storage medium of claim 14, wherein a level of confidence that a corresponding location is an object's actual location is proportional to an amount of time that the object has been at the corresponding location, according to the spatial model.

16. The non-transitory computer-readable storage medium of claim 14, wherein a level of confidence that a corresponding location is an object's actual location is a highest level of confidence when the object has been designated as a fixed location object.

17. The non-transitory computer-readable storage medium of claim 16, wherein the object is designated as a fixed location object when the object's location has not changed for a predetermined length of time.

18. The non-transitory computer-readable storage medium of claim 16, the operations further comprising:
while the vehicle is within a predefined area associated with the fixed location object, determining locations of further recognized objects in the environment, including processing only a portion of the spatial model that corresponds to the predefined area.

19. The non-transitory computer-readable storage medium of claim 14, the operations further comprising:
receiving, from at least one environmental sensor other than the stereoscopic camera, an environmental signal, wherein determining the location of the vehicle within the environment is based at least in part on the environmental signal.

20. The non-transitory computer-readable storage medium of claim 14, wherein the first and second stereoscopic image data are each based on a respective series of stereoscopic images received in real time as the images are captured by the first and second stereoscopic cameras, each stereoscopic image being captured at a fixed time interval.

* * * * *